US010967266B2

(12) United States Patent
Trice et al.

(10) Patent No.: US 10,967,266 B2
(45) Date of Patent: Apr. 6, 2021

(54) CINEMATIC GAME CAMERA IN A GAMING PLATFORM

(71) Applicant: Roblox Corporation, San Mateo, CA (US)

(72) Inventors: Elisha Jonathan Trice, San Mateo, CA (US); Parker Stebbins, San Mateo, CA (US)

(73) Assignee: Roblox Corporation, San Mateo, CA (US)

(*) Notice: Subject to any disclaimer, the term of this patent is extended or adjusted under 35 U.S.C. 154(b) by 271 days.

(21) Appl. No.: 15/901,667

(22) Filed: Feb. 21, 2018

(65) Prior Publication Data
US 2019/0255441 A1 Aug. 22, 2019

(51) Int. Cl.
A63F 13/5258 (2014.01)
(52) U.S. Cl.
CPC .................. A63F 13/5258 (2014.09)
(58) Field of Classification Search
CPC ..................................... A63F 13/5258
See application file for complete search history.

(56) References Cited

U.S. PATENT DOCUMENTS

| 5,956,045 | A | * | 9/1999 | Gotoh | G06F 3/04847 345/156 |
| 6,165,073 | A | * | 12/2000 | Miyamoto | A63F 13/10 463/32 |
| 6,267,673 | B1 | * | 7/2001 | Miyamoto | A63F 13/06 463/31 |
| 6,699,127 | B1 | * | 3/2004 | Lobb | A63F 13/10 463/43 |
| 2005/0075167 | A1 | * | 4/2005 | Beaulieu | G07F 17/3211 463/32 |
| 2007/0039030 | A1 | * | 2/2007 | Romanowich | H04N 5/247 725/105 |
| 2007/0117617 | A1 | * | 5/2007 | Spanton | A63F 13/12 463/29 |
| 2008/0263458 | A1 | * | 10/2008 | Altberg | H04L 12/66 715/757 |
| 2012/0229609 | A1 | | 9/2012 | Yamada et al. | |
| 2016/0250554 | A1 | | 9/2016 | Haigh-Hutchinson | |

OTHER PUBLICATIONS

Wikipedia, "Counter-Strike," Nov. 9, 2000, https://en.wikipedia.org/wiki/Counter-Strike (Year: 2000).*

(Continued)

Primary Examiner — Kevin Y Kim
(74) Attorney, Agent, or Firm — IP Spring

(57) ABSTRACT

A method and system is disclosed receives a user selection of a game from a gaming platform via a user interface. The method and system receives a user selection of a camera option of the game. The camera option enables a camera to be controlled within a three-dimensional (3D) environment of the game by a user during real-time gameplay. The method and system move the camera within the 3D environment during the real-time gameplay responsive to user input to move the camera. The method and system responsive to moving the camera within the 3D environment, provide, via the user interface, a presentation of views from a perspective of the camera of the real-time gameplay in the 3D environment.

18 Claims, 10 Drawing Sheets

(56) References Cited

OTHER PUBLICATIONS

Moby Games, "Half-Life: Counter-Strike Promo Art," 2001, https://www.mobygames.com/game/half-life-counter-strike/promo/imageType,1/promoImageId,97031/ (Year: 2001).*
USPTO, Written Opinion for International Patent Application No. PCT/US2019/018492, dated May 8, 2019, 4 page.
USPTO, International Search Report for International Patent Application No. PCT/US2019/018492, dated May 8, 2019, 5 pages.

* cited by examiner

CINEMATIC GAME CAMERA IN A GAMING PLATFORM

TECHNICAL FIELD

This disclosure relates to the field of gaming platforms and, in particular, to providing a user-controllable game camera in game environment for recordation of real-time gameplay.

BACKGROUND

Collaboration platforms allow users to connect to and share information with each other via the Internet. Users of a collaboration platform, such as a gaming platform, may participate in multiplayer gaming environments, design custom gaming environments, decorate avatars, or exchange virtual items with other users, and so forth.

DESCRIPTION OF DRAWINGS

Various implementations of the disclosure will be understood more fully from the detailed description given below and from the accompanying drawings of various implementations of the disclosure.

DETAILED DESCRIPTION

Figure 1:
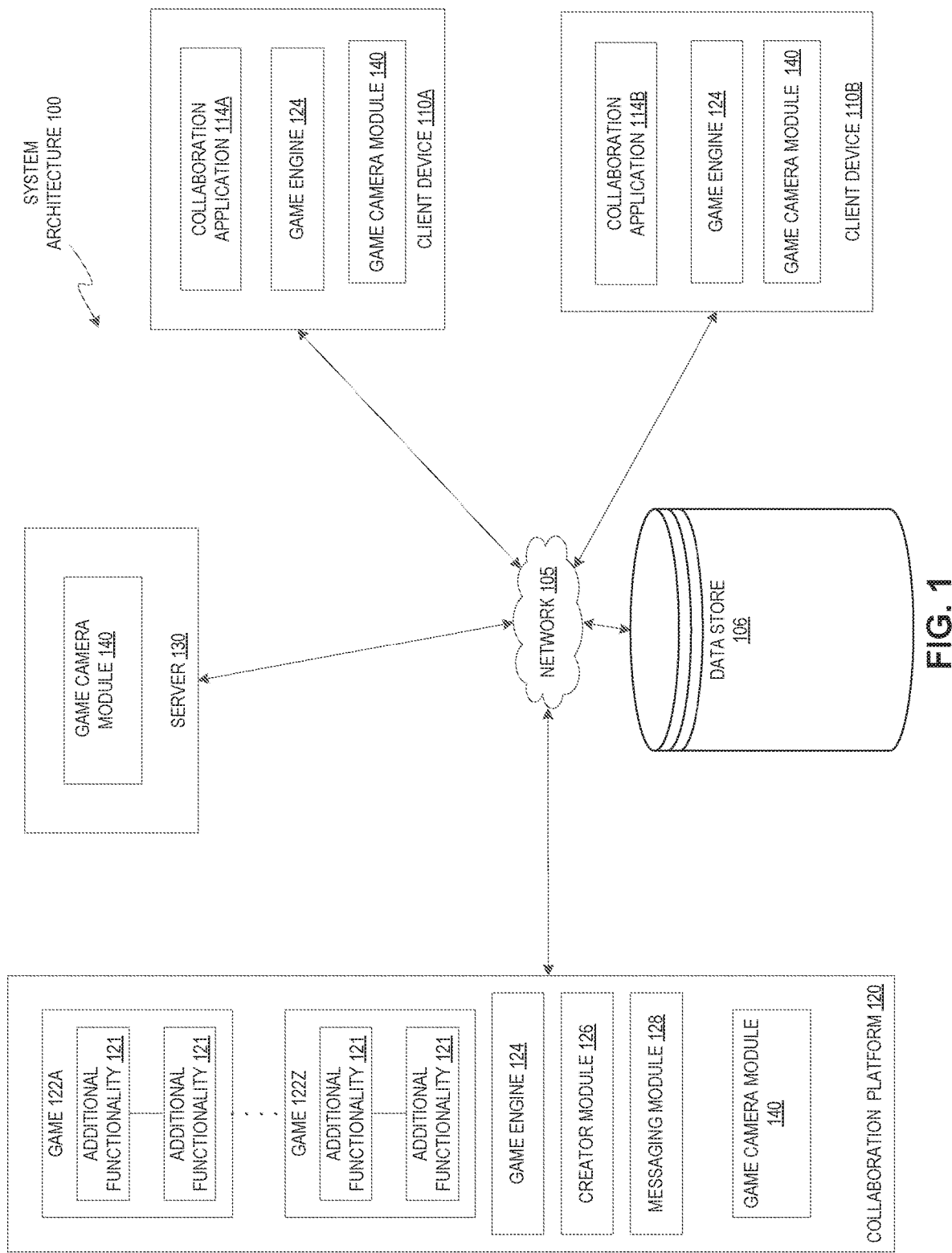
FIG. 1 illustrates an example system architecture, in accordance with implementations of the disclosure.

Collaboration platforms, such as gaming platforms, offer a variety of ways for users to interact with one another. For example, users of a gaming platform may work together towards a common goal, share various virtual gaming items, send electronic messages to one another, and so forth. Users of a collaboration platform may play games (e.g., playing users) with characters or create games (e.g., creating users) with developmental tools via the collaboration platform.

In some systems, a playing user may play a game online with one or more other players. The playing user may control a character and view the game environment from either a first-person perspective or a third-person perspective. In both cases, the views of the gameplay are presented on the client device from the character's perspective. The playing user may have no other option other than displaying the gameplay from the character's perspective. In some instances, the playing user may record the gameplay by using a software application to record the view of the gameplay from the perspective of the character. The video of the gameplay may be shaky and jittery reflecting the playing user's control of the character in the game.

In other systems, a playing user may use a camera to record views of gameplay that are separate from the views of the user's character. However, the camera is often locked at a certain angle or used to record pre-recorded gameplay, rather the real-time or live gameplay. In still other systems, the camera may be locked into a certain position and record real-time gameplay. The recorded real-time gameplay is later sent to an editing application that allows the camera to view the recorded gameplay from different angles using a game engine, for example.

Playing users may want to control the game camera to create high-quality footage of live, multiplayer gameplay to create videos that demonstrate the games, the gameplay, and so forth.

Aspects of the disclosure address the above-mentioned and other challenges by enabling a user to select a camera option of a game that enables a user-controlled camera (also referred to as "game camera" herein) to be controlled within a game environment during real-time gameplay. In some implementations, the user may control the camera and the user's character. The views of the real-time gameplay may show the gameplay from the perspective of the camera. In some implementations, the user may move the camera around the game environment, such as three-dimensional (3D) game environment, freely and without restriction. The views of the camera of the real-time gameplay are presented on the display of the client device and may be recorded. In some implementations, the user may use the camera to generate views of real-time gameplay of a multiplayer game. In further implementations, the camera may have additional cinematic features such as zoom, stabilization, pan, lock, track, among other features that help the camera user generate cinematic-like videos of real-time gameplay. Since the camera may be controlled by the user during real-time gameplay from the perspective of a game camera that is unattached to a character the videos may be produced as cinematic quality videos without additional post-production editing.

Accordingly, aspects of the disclosure enable a user to select a camera option of a game that enables a camera to be controlled within a 3D environment of a game during real-time gameplay. In particular, the aforementioned addresses technological challenges of enabling a camera to generate views of real-time gameplay independent of a user's character where the views may be recorded as a video. Enabling a camera to generate views of real-time gameplay independent of a user's character improves the technological process of a game camera. The aforementioned game camera also improves operation of a computer or computer network by reducing or network traffic by, for example, allowing the client device to perform operations of the game camera using the game engine used to render the game on the client device. The aforementioned game camera also improves the operation of a computer or computer network by reducing the processing requirements used, for example, recording gameplay from a stationary position within the game, and subsequently performing post-processing of the recorded video to change the camera position or incorporate cinematic features into the video.

It may be noted that a collaboration platform described as a gaming platform herein is provided for purposes of illustration, rather than limitation. A collaboration platform may be one or more of numerous platforms, such as a gaming platform, a social networking platform, purchasing platform, a messaging platform, creation platform, and so forth. It may be further noted that aspects of the disclosure are illustrated using an example of a gaming platform and games for purposes of illustration, rather than limitation.

FIG. 1 illustrates an example system architecture 100, in accordance with one implementation of the disclosure. The system architecture 100 (also referred to as "system" herein) includes client devices 110A and 110B (generally referred to as "client device(s) 110" herein), a network 105, a data store 106, a collaboration platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server 130 may be one or more computing devices (e.g., a rackmount server, a server computer, etc.). In implementations, the server 130 may be included in the collaboration platform 120, be an independent system, or be part of another system or platform. The server 130 may include game camera module 140.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110. It may be noted that collaboration application 114A and 114B may generally referred to as collaboration application(s) 114. In some implementations, collaboration application 114 may be two instances of the same application.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user."

In one implementation, collaboration platform 120 may be a gaming platform, such as an online gaming platform or virtual gaming platform. For example, the gaming platform may provide single-player or multiplayer games to a community of users that may access or interact with the games 122A-122Z using client devices 110 via network 105. In implementations, games 122 (also referred to as "video game," "online game," or "virtual game" herein) may be two-dimensional (2D) games, three-dimensional (3D) games, virtual reality (VR) games, or augmented reality (AR) games, for example. In implementations, a game 122 may be played in real-time with other users of the game 122.

In some implementations, a game 122 can include an electronic file that can be executed or loaded using software, firmware or hardware configured to present the game content (e.g., digital media item) to an entity. In some implementations, a game 122 may be executed by a game engine 124 to generate a gaming video including multiple frames and audio. The gaming video may be generated (e.g., rendered) by the game engine 124 based on commands or user input. In some implementations, a game engine 124 (e.g., a rendering engine of the game engine 124) receives user input and generates a gaming video based on the user input. In some implementations, a game engine 124 (either local to the client device 110 or at collaboration platform 120) receives user input and generates commands (e.g., rendering commands, graphics library commands, etc.) based on the user input. In some implementations, a game engine 124 (e.g., a rendering engine of the game engine 124) receives from collaboration platform 120 the generated commands and generates the gaming video based on the generated commands. The gaming video may be displayed via a user interface of a client device 110.

In some implementations, collaboration platform 120 hosts games 122 and allows users to interact with the games 122 using collaboration application 114 of client devices 110. Users of collaboration platform 120 may play, create, interact with, or build games 122, or create and build objects (e.g., also referred to as "item(s)" or "game objects" or "virtual game item(s)" herein) of games 122. For example, in generating user-generated virtual items, users may create characters, decoration for the characters, one or more virtual environments for an interactive game, or build structures used in a game 122, among others. In implementations, users may buy, sell, or trade game virtual game objects, such as in-platform currency (e.g., virtual currency), with other users of the collaboration platform 120. In implementations, collaboration platform may transmit game content to collaboration applications 114. Game content (also referred to as "content" herein) may refer to any data or software instructions (e.g., game objects, game, user information, video, images, commands, media item, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, etc.) to each of the client devices 110 to display interactions of the multiple users in a multiplayer gaming environment. In another implementation, collaboration platform 120 may transmit the game content from one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user(s) with a game 122 using user account information (e.g., a user account identifier such as username and password).

In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics, among other features. In some implementations, an instance of game engine 124 may be included on client devices 110. In some implementations, game engine 124 of client devices 110 may work independently, in collaboration with game engine 124 of collaboration platform 120, or a combination of both.

In implementations, collaboration platform 120 may include a creator module 126. In implementations, creator module 126 may allow users to become creators to design or create environments in an existing game 122 or create new games or create new game objects within games or environments. In some implementations, a game 122 may have a common set of rules or common goal, and the environments of a game 122 share the common set of rules or common goal. In implementations, different games may have different rules or goals from one another. In some implementations, games may have one or more environments (also referred to as "gaming environments" or "virtual environment" herein) where multiple environments may be linked. An example of an environment may be a three-dimensional (3D) environment. The one or more environments of a game 122 may be collectively referred to a "world" or "gaming world" or "virtual world" or "universe" herein. An example of a world may be a 3D world of a game 122. For example, a user may build a virtual environment that is linked to another virtual environment created by another user. A character of the virtual game may cross the virtual border to enter the adjacent virtual environment. In implementations, game objects (e.g., also referred to as "item(s)" or "objects" or "virtual game item(s)" herein) may refer to objects that are used, created, shared or otherwise depicted in games 122 of the collaboration platform 120. For example, game objects may include a part, model, character, tools, weapons, clothing, buildings, vehicles, currency, flora, fauna, components of the aforementioned (e.g., windows of a building), and so forth. It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, and skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for view or use by other users of collaboration platform 120. It some implementations, creating, modifying, or customizing characters, other game objects, games 122, or game environments may be performed by a user using a user interface (e.g., developer interface) and with or without scripting (or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, creator module 126 includes a unique personal build and publishing service for creating and administering games 122 and gaming environments on the Internet that allows users (also referred to as "creating users," "creators," "owners," or "owning users" herein) to create, own, or administrate games 122 and gaming environments using cloud-mediated computational resources, for example. In implementations, creator module 126 may use a user interface (also referred a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or place game objects within a game 122 or environment. The user may publish their selected game objects via the developer interface so that the game objects are available to playing users of the game 122 or environment.

In implementations, collaboration platform 120 executing creator module 126 includes a user-interfacing website or application (e.g., collaboration application 114) where users may access online computational resources hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114.

In implementations, creator module 126 may provide control of created games 122 and environments to owning users who may set administrative policy regarding who will be allowed to interact with the created game 122 or environment and who has the capability of modifying, editing, or interacting with the game 122 or environment. Users with administrative control may also be referred to as owning users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other collaborative or group associated online venues. In implementations, creator module 126 has administrative tools for setting such policies including or in addition to general rules for interaction within the game 122 or gaming environment.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web application (e.g., an application that operates in conjunction with a web browser) that can access, retrieve, present, and/or navigate content (e.g., virtual character in a virtual environment, etc.) served by a web server. In another example, collaboration application 114 may be a native application. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to build, create, edit, upload content to the collaboration platform 120 as well as interact with collaboration platform 120. As such, the collaboration applications 114 may be provided to the client devices 110A and 110B by the server 130 or collaboration platform 120. In another example, the collaboration applications 114 may be applications that are downloaded from the server 130. In some implementations, collaboration application 114 of client device 110 may include game engine 124. In some implementations, game engine 124 of client device 110 may be separate from collaboration application 114A.

In implementations, a user may login to collaboration platform 120 via collaboration application 114. The user may access a user account by providing user account information (e.g., username and password) where the user account is associated with one or more characters available to participate in one or more games 122 of collaboration platform 120.

In general, functions described in one implementation as being performed by the collaboration platform 120 can also be performed on the client devices 110A through 110B, or server 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120.

For the sake of illustration, rather than limitation, game camera module 140 is described as implemented on client device 110. In other implementations, game camera module 140 may in part or wholly be implemented on collaboration platform 120. In other implementations, game camera module 140 may in part or wholly be implemented on server 130. In other implementations, game camera module 140 operating on one or more of client device 110, server 130, or collaboration platform 120 may work in conjunction to perform the operations described herein. Although implementations of the disclosure are discussed in terms of collaboration platforms, implementations may also be generally applied to any type of social network providing connections between users. The game camera module 140 may help facilitate the operations described herein, such as operation described with respect to FIG. 2 through FIG. 5.

In implementations, game camera module 140 may allow a user to control a camera within a game environment or world, where the views of the camera are presented in the user interface for display by the client device 110. The views may be recorded as a video for subsequent edit, playback, transfer, or viewing. The operations of game camera module 140 are further discussed with respect to at least FIG. 2-5.

In some implementations, the game camera module 140 may part of collaboration application 114, such as a plug-in. In other implementations, game camera module 140 may be a separate application executing on client device 110.

In some implementations, the client device 110 may record real-time gameplay of a multiplayer game from the perspective of the camera using the game camera module 140. One or more of the players of the multiplayer game may be operating on different platforms. For example, a first playing user may be playing the multiplayer game from an Xbox™, and another playing user may be playing the multiplayer game from a Personal Computer, and the camera user (e.g., user operating the camera) may be accessing the multiplayer game from a mobile device operating Android™. In some implementations, creating users may customize features or create features for the camera of game camera module 140.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2A:
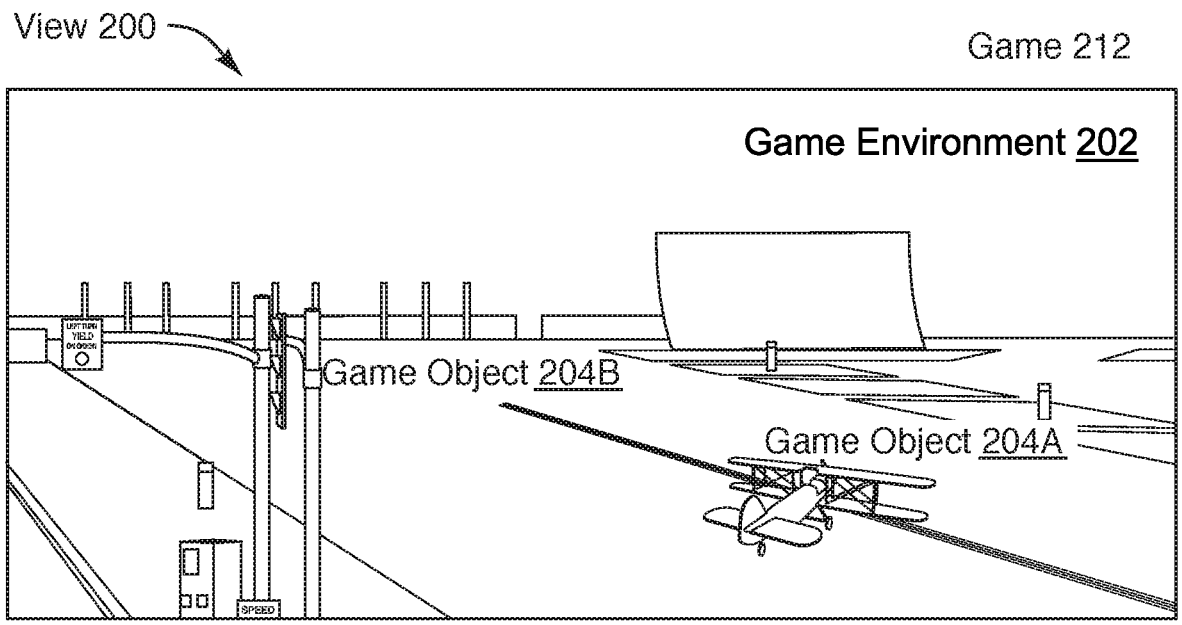
FIGS. 2A-2D illustrate views of a game environment from a perspective of a camera, in accordance with implementations of the disclosure.

FIG. 2A illustrates a view of a game environment from a perspective of a camera, in accordance with implementations of the disclosure. It may be noted that views 200, 220, 240, and 260 of FIG. 2A-2D respectively show views of gameplay of game 212 at progressively later points in time (e.g., view 200 occurs before view 220, which occurs before view 240, etc.). It may be further noted that elements of previous Figures may be used to help illustrated the present Figure.

In some implementations, a user may select a game from multiple games provided by a gaming platform. A user interface of the client device 110 may display the selected game. The game 212 may include a camera option (not shown) that responsive to being selected by the user, enables a camera to be controlled within the game environment 202 (or world) of the game 212 during real-time gameplay. The camera may be moved or otherwise controlled to present a number of views of the real-time gameplay from the perspective of the camera, rather than from the perspective of the character. The views are presented in the user interface of the client device of the camera user for recordation. It may be noted that the user controlling the camera may be referred to as the "camera user" herein.

In implementations, a view (also referred to as "field of view" herein) may refer to the extent of the observable game environment (or game world) that may be seen at any given moment by the camera and that is presented in the user interface of the client device 110. The view 200 shows the view of the game environment 202 from the perspective of the camera. In some implementations, the perspective of the camera may be similar to a first-camera view or perspective, as illustrated in FIG. 2A. The view 200 may include and make visible a particular portion of the game environment 202. As the camera moves in the environment, the view of the camera may also change. As the camera moves, the camera may capture multiple views and the views (e.g., the game content therein) are presented to the user from the perspective of the camera. In some implementations, game environment 202 may be a 3D game environment, as illustrated in FIG. 2A-D.

In implementations, the views of the camera may be presented on a display of the client device 110 of the camera user as real-time gameplay and recorded as a video, such as high-definition video, by the client device 110 of camera user or the collaboration platform 120. In some implementations, the views may be continuously recorded by a video recording application local to the client device 110 of the camera user. The video recording application may be part of game camera module 140 of client device or be a third-party application. A video (also referred to as "video item" herein) is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

It may be noted that in other implementations, the video may be captured as a game video where the frames are rendered using a game engine (e.g., rendering commands). A game video may have additional functionality where views of the game video may be further manipulated after recordation. For example, the view of a game object may be manipulated so that any side of the game object may be shown in a particular view.

In implementations, the view 200 may show real-time or live gameplay of the particular game 212 of collaboration platform 120. Game 212 may be similar to games 122 as described with respect to FIG. 1. Gameplay may refer to interaction of one or more players with a game, such as how one or more players interact with a game object 204 or game environment 202, and the presentation of the interaction in the view. Real-time or live gameplay may refer to the broadcast, presentation, or display of gameplay as the gameplay occurs, rather than past or recorded gameplay. For example, real-time gameplay may be displayed in a view substantially concurrent to user interaction with the game environment (at least within the technical limitations of displaying real-time action). For instance, the user interaction with the game environment 202 may be displayed within milliseconds of user input and may appear to the user as in if in absolute real-time.

In an implementation and as illustrated in FIG. 2A, view 200 captures real-time gameplay of game 212 where multiple players (e.g., of a multiplayer game) interact with the game environment 202. In real-time gameplay, a user may control a character in the game environment 202 and in real-time (or within the technical limitations of displaying real-time action) see the character interact with the game environment 202, or see other characters interaction with the game environment 202.

As illustrated in FIG. 2A-D, game 212 is a multiplayer game where a user is operating the plane (i.e., game object 204A) and other users are operating other game objects. For instance, another user is controlling the car (i.e., game object 204C) of FIG. 2B. In the present illustration, the user controlling the camera (also referred to as "camera user" herein) is a separate user and is not controlling a character in game 212. It may be noted that in other implementations as described herein, the camera user may control both the camera and a character in a game 212. For purposes of illustration, rather than limitation only game objects 204A (i.e., plane) and 204B (i.e., light post) are labeled in view 200. View 200 includes many additional game objects such as the road, the street signs, the sidewalk, etc.

In some implementations, the camera may be visible to other players of the multiplayer game. For example, the camera may be represented as a camera game object (not shown) and in some instance, may be provided so that users may know where the camera is pointing. In implementations, the camera does not affect game objects 204 in the game environment 202. For example, a camera object may move through other game objects 204 of the game environment 202 without affecting the game object 204 (e.g., without the graphical representation of a collision with the game object 204). In implementations where the camera is visible to other players, a client device 110 of the camera user may from time to time send physical position information (e.g., coordinates in the game environment 202) or velocity information of the camera to collaboration platform 120 (or other client devices) so that the movement of the camera may be accurately presented on the client devices of the other players. Additionally, the client device 110 of the camera user may receive physical position information, velocity information, and character information (e.g., parts that the character is made from) of the characters of the other playing users (from the collaboration platform 120 or directly from the other client devices) so that the client device 110 can render the real-time gameplay of the game 212 accurately. In cases where a character of the multiplayer game is operating a game object such as a plane or car, game object information (e.g., parts the car or plane is made from) may also be sent to the client device 110 of the camera user (by the collaboration platform 120 or directly from the other client devices) so that the client device 110 of the camera user can render the real-time gameplay of the game 212 accurately. In implementations, to render the real-time gameplay, client device 110 may use game engine 124 local to the client device 110 to generate commands (e.g., rendering commands, audio commands, physics commands) and render the real-time gameplay for display on the client device 110.

In some implementations, the camera may not be visible to other users in a multiplayer game. For example, the camera may move around the game environment 202 with complete anonymity and have no in-game object representing the camera. In implementations, where the camera is invisible to the other users in a multiplayer game the client device 110 of the camera user may not send physical position information or velocity information of the camera (or any information about the location of the camera) to the collaboration platform 120 or other client devices because the information is not used to present the camera to the other playing users in the game environment. In implementations where the camera is invisible to the other players of the multiplayer game, the client device 110 of the camera user may still receive physical position information, velocity information, and character information of the characters of the other playing users, and game object information where the characters are operating game objects. Client device 110 may use game engine 124 local to the client device 110 to generate commands (e.g., rendering commands, audio commands, physics commands, etc.) and render the real-time gameplay for display on the client device 110.

Figure 2B:
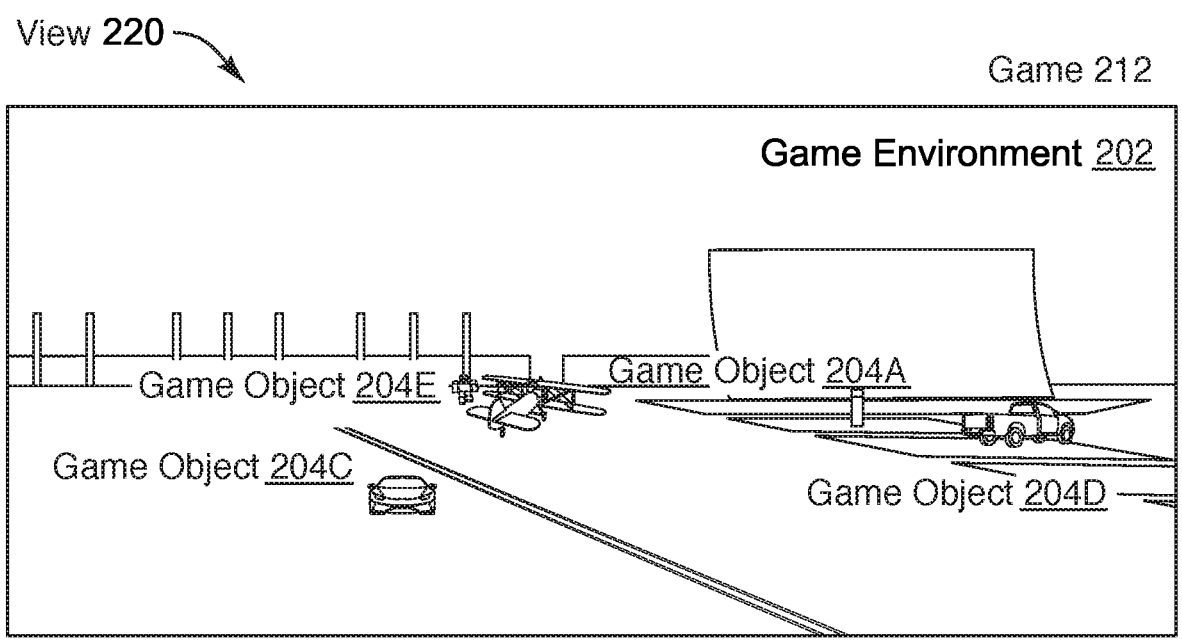

FIG. 2B illustrates another view of a game environment from a perspective of a camera, in accordance with implementations of the disclosure. In view 220, the camera has moved (responsive to user input) within the game environment 202 to focus on the action. A character (i.e., game object 204E) is jumping out of the burning plane (i.e., game object 204A) as two cars (i.e., game object 204C and 204D) are driving in the view.

In implementations, the camera user may move the camera within the game environment 202 (or game world) without restriction. The camera user may move the camera to the full extent of the game map (e.g., a map that defines the boundaries of the game environment or game world). Unlike a character, that may have restrictions on where the character may go within the game environment 202 (or game world), the camera may have no such restriction. For example, the camera users may use key strokes, mouse input, voice input, a game control, or otherwise to control the movement (or features) of the camera within the game environment 202 (or game world).

In some implementations, the position of the camera within the game environment 202 may be changed during the real-time gameplay based on the user input. The position of the camera may refer to coordinates in the 3D space of the game environment 202 where the camera is located. Responsive to user input, the position of the camera in the game environment 202 may be moved and so that new views of the real-time gameplay may be captured by the camera.

In some implementations, the orientation of the camera within the game environment 202 during real-time gameplay may be changed based on user input. The orientation of the camera orientation may refer to a direction the camera points (e.g., camera angle) in 3D space from a given position in the 3D environment. For example, at a given position in the game environment 202, the orientation of the camera may point directly down (view the asphalt in FIG. 2B), point up into the sky, point towards the plane (e.g., as illustrated in FIG. 2B), where in each instance the view from the perspective of the camera (e.g., the direction the camera is pointing) is provided for presentation in the display of the client device 110. In implementations, the position or orientation of the camera may be changed concurrently or separately, In some implementations, the game camera may be used by users that have permitted access to the camera, such as creating users that have created or than own a particular game. If playing users are permitted to use the camera, the playing users may be able to cheat in a game. For example, in a game of "hide and seek" playing users with access to the camera could use the camera to find the hiding users.

Figure 2C:
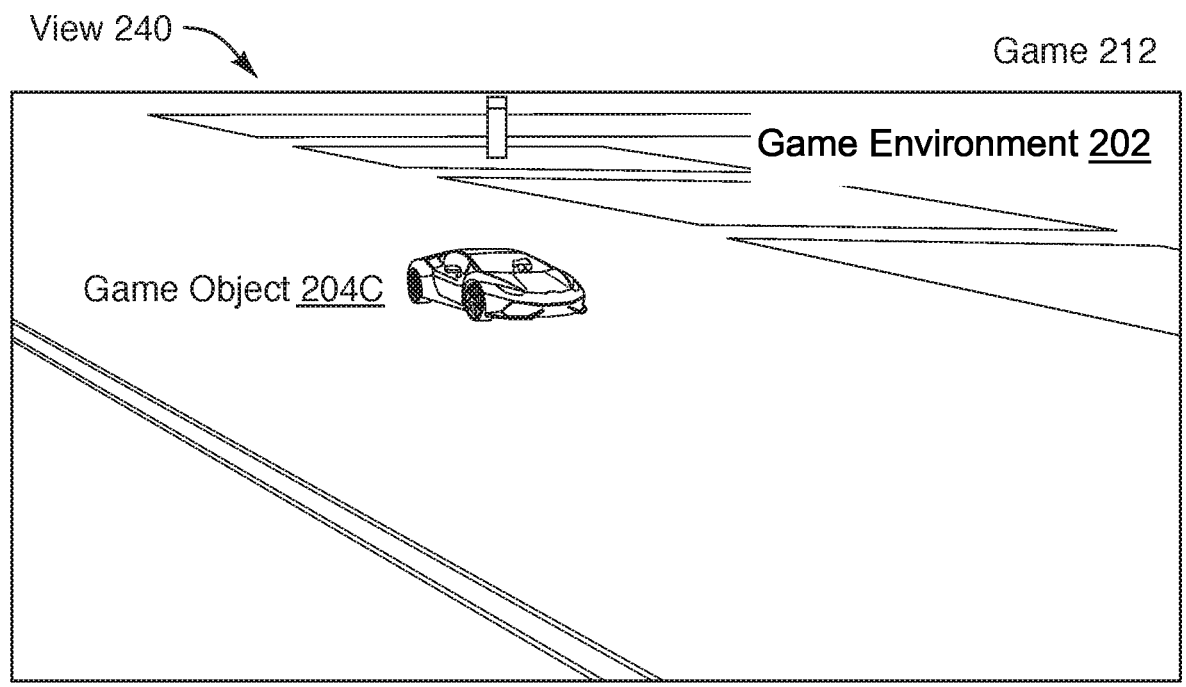
Figure 2D:
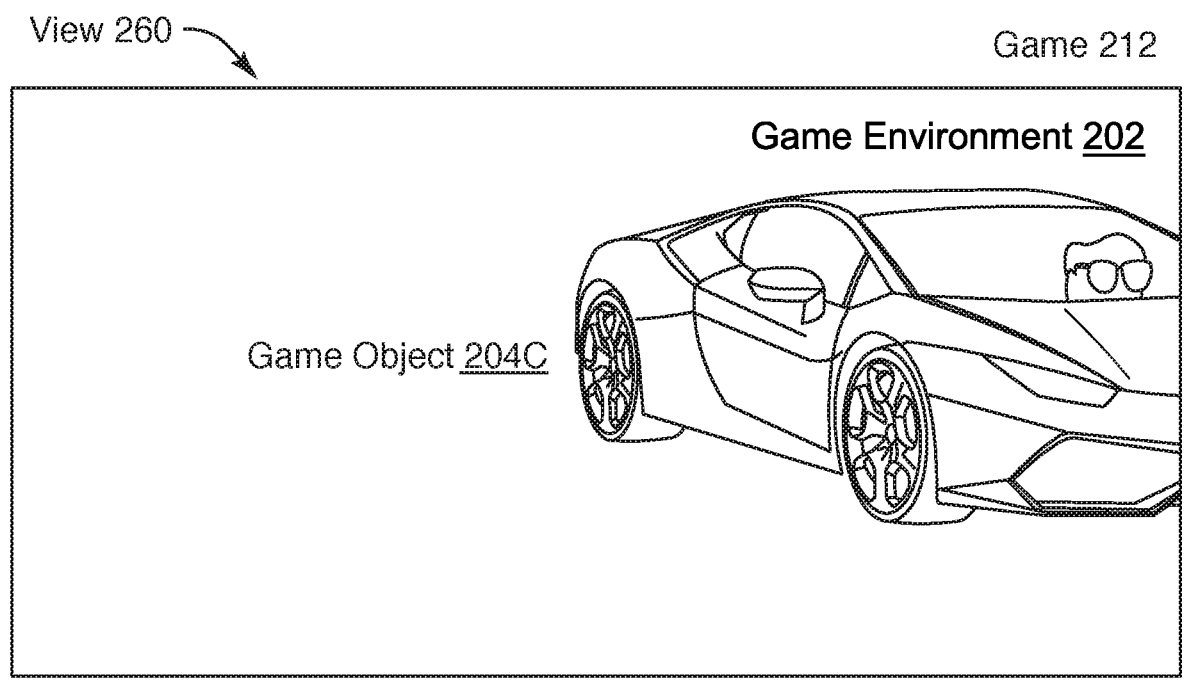

FIG. 2C and 2D illustrate still additional views of a game environment from a perspective of a camera, in accordance with implementations of the disclosure. The camera moves to focus in on the car (i.e., game object 204C) as the car drives from the scene of the plane crash. The user controls both the position and the orientation of the camera to follow the car. And as illustrated in FIG. 2D, the camera pivots in orientation and captures the car moving past.

In implementations, the camera may include one or more cinematic features controllable by the camera user. The cinematic features may be used or adjusted to capture real-time gameplay. The user of the camera may choose to implement, using user input, any one of the cinematic features. In some implementation, the camera may include a stabilization feature that stabilizes or smooths the movement of the camera so that the presentation of the views of the camera does not appear shaky, blurred, or otherwise undesirable. For example, a user controlling the camera using user inputs may control the position of the camera in 90 degree increments (e.g., up, down, right, left). The views from the coarse control of the camera may look equally coarse without stabilization. With camera stabilization the views may be smoothed. For instance, the user may provide user inputs to control the position of the game camera. The users hand, for example, may be relatively shaky and the plotted position coordinates responsive to the user inputs may appear noisy (e.g., many fast changing peaks and troughs). The noisy plotted position coordinates may be translated to the movement of the camera and produce "shaky" views. In some implementations, stabilization may use the time-sequenced position coordinates or time-sequenced user inputs (also referred to as "data" or "data points") to generate an approximating function that captures patterns in the data, and leaves out noise or other fine-scale structures or rapid changes in position (e.g., low-pass filtering). The data points of the signal are modified so that individual points that are higher than the immediately adjacent points (presumably because of noise) are reduced, and points that are lower than the adjacent points are increased. The modified data points may be the modified position coordinates (or the modified user input that is translated to position coordinates) that directs the camera's movement (e.g., stabilized movement). It may be appreciated that one or more smoothing techniques may be used, such as moving average, weighted moving average, and so forth. In another implementation, the speed of the camera may be controlled by user input. In some implementations, the movement between positions in the game environment 202 or between orientations may be constant. In other implementations, the user may vary the speed of the camera for movement between positions or orientations. For example, the user may move the camera between two positions within game environment 202 at a fixed speed. If the user chooses, the user may follow a game object (e.g., plane) moving at a very high speed, where the camera changes speed to also move at a very high speed to track the game object.

In other implementations, cinematic features of the camera may include a variety of filters of the camera that change, for example, the color (e.g., black and white) or tint (e.g., rose color) of the presentation of real-time gameplay in the view. In still other implementations, the cinematic features may include a variety of lenses that may change the view of the camera. For example, a fishbowl lens may present gameplay as if the camera is viewing the real-time gameplay looking through a fishbowl. In another example, a panoramic lens may increase the dimensions of the view in the horizontal direction. In still other implementations, cinematic features may include changing lighting where the user may control the brightness or direction of lighting (from where the light shines in the game environment 202).

FIG. 3A-3D illustrates views of a game environment from a perspective of a camera using a pan feature, in accordance with implementations of the disclosure. It may be noted that game 312 may be similar to game 122 of FIG. 1. It may be noted that views 300, 320, 340, and 360 of FIG. 3A-3D respectively show views of gameplay of game 312 at progressively later points in time (e.g., view 300 occurs before view 320, which occurs before view 340, etc.).

FIG. 3A-3D shows a camera user concurrently controlling both the camera and a character (i.e., game object 304A). For example, a user may select a game 312 and enter a selected game 312. The view of the game 312 may initially be from the perspective of the character (e.g., first-person view). Subsequent to selecting the camera option, the camera may virtually detach or release from the character, which releases the view from the perspective of the character and changes the view to the perspective of the camera. In some implementations, the view presented (after selection of camera option) is exclusively from the perspective of the camera (as shown in FIG. 3A-3D). In other implementations, a view from the perspective of the camera and a view from the perspective of the character may be provided concurrently. For example, the two views may be provided in a split-screen fashion or in two different windows.

In some implementations, the user may select a cinematic feature such as a pan feature from feature selection area 306, for example. The pan feature may allow the camera to rotate around a particular object in a circular fashion and present the views containing the object during the rotation of the camera. For example, a user may select the pan feature from the feature selection area 306 and select a game object (e.g., game object 304B) around which to pan. The camera may rotate or orbit about the game object 304B in a fixed radius (e.g., circle) or variable radius (e.g., oval) to generate different views of the game object 304B while orbiting the game object 304B. The user may stop the orbit at any time or control the speed of the orbit or continue the obit for any duration.

In an implementation, a user selects the pan feature of the camera using a user input (e.g., key stroke, user mouse selection, etc.). The user may position the camera at a particular position with respect to the game object 304B (e.g., starting point and radius of orbit, and angle at which the camera views the game object, such as from above the game object, level with, etc.). The user may select a particular game object 304B around which the camera will orbit by using a cursor to select the game object 304B, for example. The client device may determine a 3D center (e.g., origin) of the object. For example, the coordinates of the all the sides of the objects may be used as input to a function to determine the center of the object. If the object is asymmetrical, a symmetric object may be estimated for the asymmetric object and the estimated symmetric object may be used to find the center of the asymmetric object. For example, for a human figure a rectangle what contains the human figure may be estimated, and the origin of the rectangle may be used as the center of the human. Responsive to selecting the game object 304B, the camera may begin to rotate around the game object 304B and present the views from the perspective of the camera as the camera rotates around the center of the object.

Figure 3A:
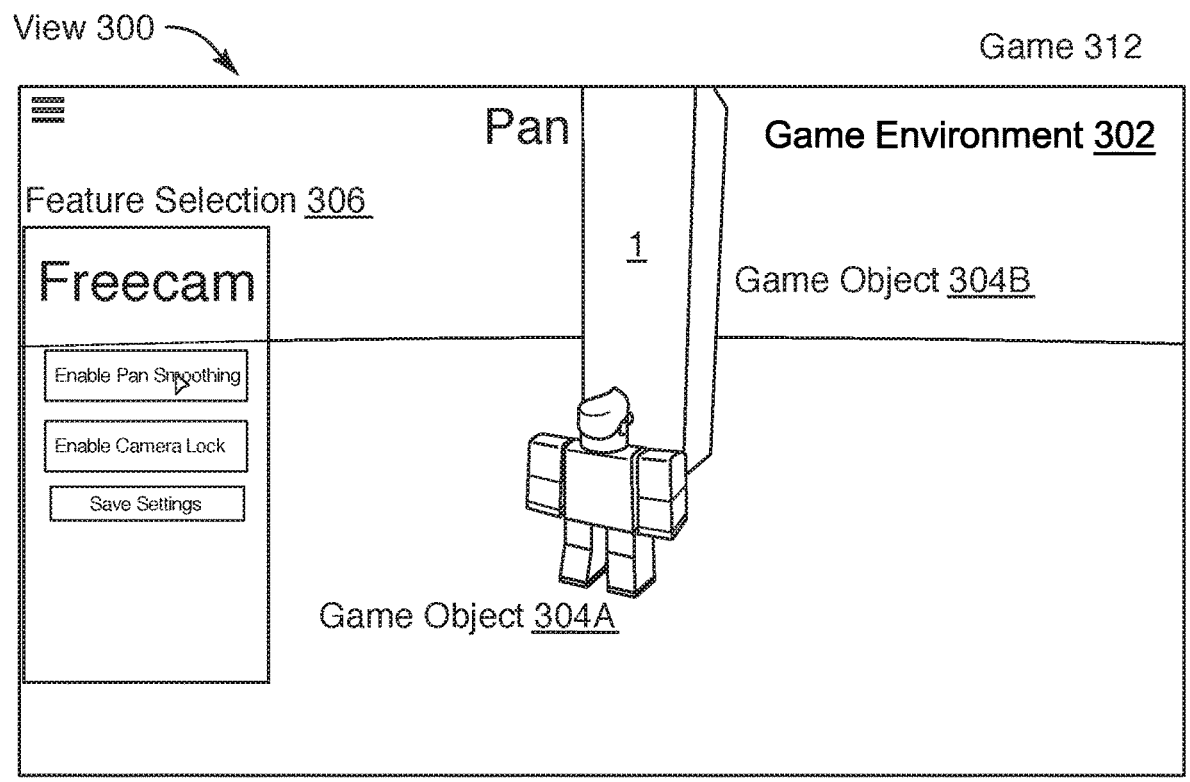
FIGS. 3A-3D illustrate views of a game environment from a perspective of a camera using a pan feature, in accordance with implementations of the disclosure.

For example, view 300 as shown in FIG. 3A illustrates a user selecting a pan feature from feature selection area 306. The view 300 of game 312 shows game environment 302 that includes game object 304B and game object 304A (camera user's character). The sides of game object 304B are labeled 1 through 4 to help illustration. The user then orientates the camera in the manner the camera user would like the camera to orbit the game object 304B. Subsequent to selecting the pan feature, the user selects game object 304B.

Figure 3B:
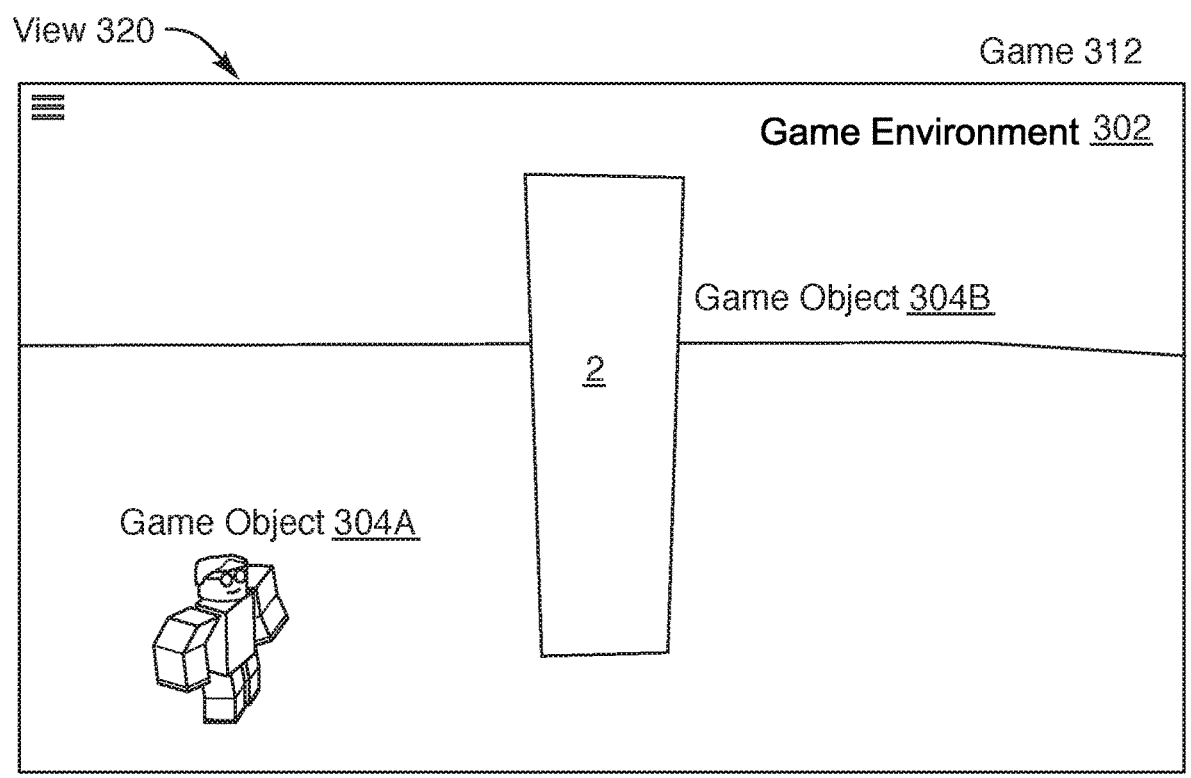
Figure 3C:
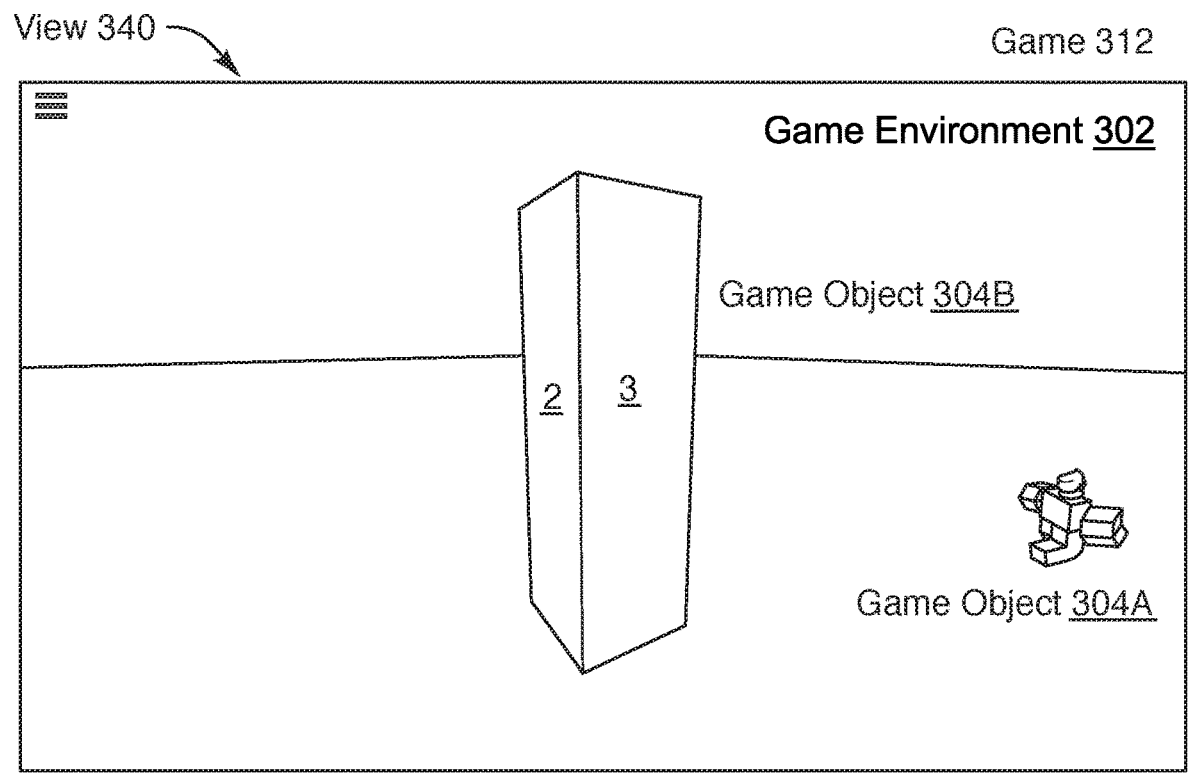
Figure 3D:
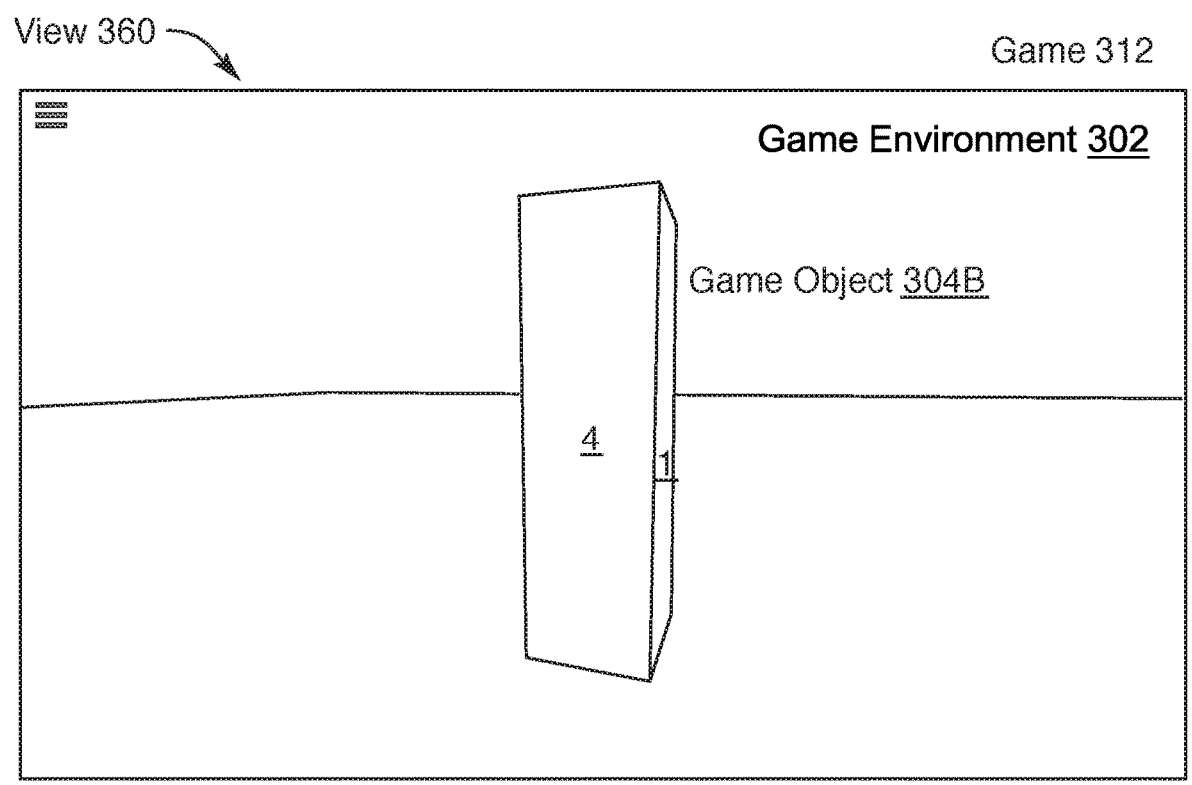

In FIG. 3B, view 320 shows the camera as it begins to orbit (counter clockwise) around game object 304B. The direction of the obit may be controlled by the user (e.g. clockwise or counterclockwise). The camera user has not moved the character (i.e., game object 304B). In FIG. 3C, view 340 shows the camera continuing to orbit around game object 304B, and the camera user is moving the character away from game object 304B. In FIG. 3D, view 360 shows the camera continuing to orbit around game object 304B, and the user has moved the character out of the view 360.

In some implementations where the game 312 is a single player game (or the camera user is controlling the only character in a multiplayer game), information about the character (i.e., game object 304A), such as position information or velocity information, is not sent to collaboration platform 120, and the client device of the camera user does not receive other character information with respect to other characters of game 312. In some implementations, the camera functionality may execute locally on the client device. The rendering of game environment 302 may be performed locally on the client device 110 using the game engine 124 of the client device 110.

FIG. 4A-4F illustrate views of a game environment from a perspective of a camera using a lock feature, in accordance with implementations of the disclosure. It may be noted that elements of FIG. 3A-3D are used for purposes of illustration of FIG. 4A-4F, rather than limitation. FIG. 4A-4F shows a camera user concurrently controlling both the camera and a character (i.e., game object 304A). It may be noted that views 400, 415, 430, 445, 460, and 475 of FIG. 4A-4F respectively show views of gameplay of game 312 at progressively later points in time (e.g., view 400 occurs before view 415, which occurs before view 430, etc.).

In some implementations, the user may select a cinematic feature such as a lock feature. The lock feature may allow the camera to be mounted at a fixed position in the game environment 302 and lock the view of the camera onto a game object, such as a character (i.e., game object 304A). The camera may automatically change its orientation from the fixed position to follow the game object as the game object moves in the game environment 302. The selected game object may be kept in a center area of the view of the camera.

Figure 4A:
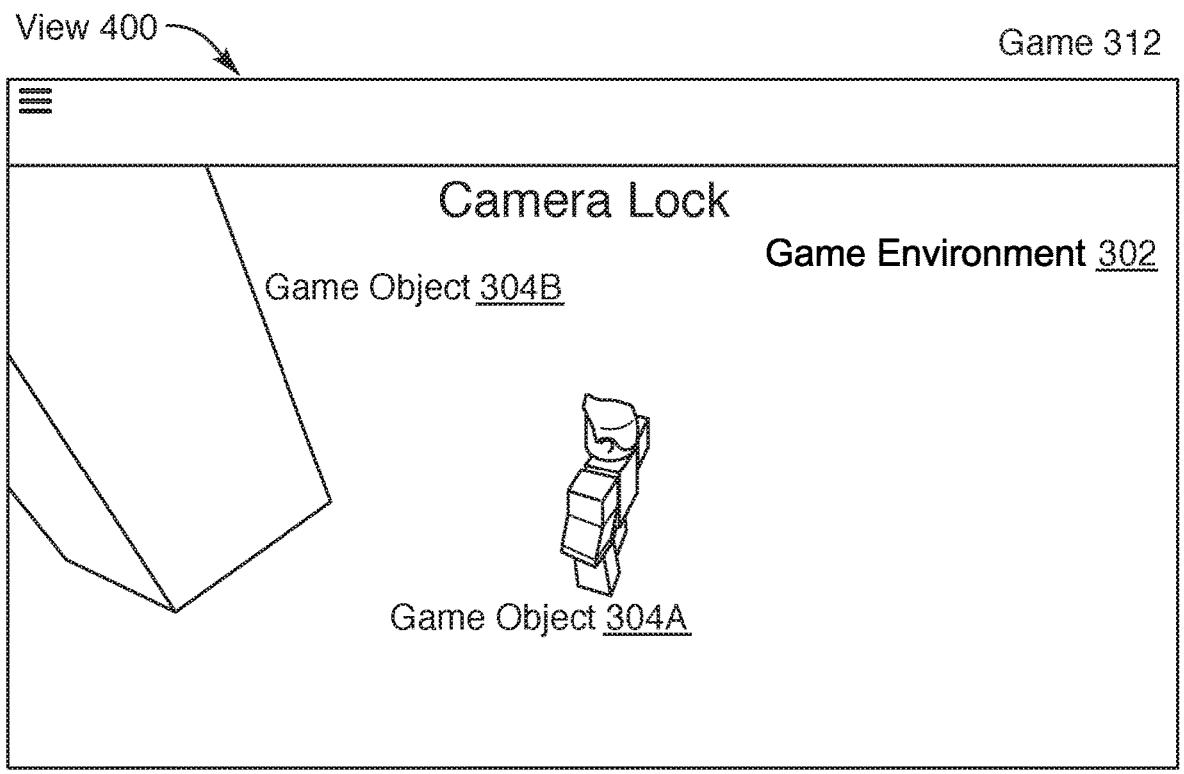
FIGS. 4A-4F illustrate views of a game environment from a perspective of a camera using a lock feature, in accordance with implementations of the disclosure.

View 400 as shown in FIG. 4A illustrates a user selecting a lock feature. The view 400 of game 312 shows game environment 302 that includes game object 304B and game object 304A (camera user's character). The camera user may select a position of the camera by moving the camera to the position in the game environment 202 and selecting the lock feature. In view 400, the camera user has positioned the camera so that the view 400 is approximately centered on game object 304A. Once a suitable position for the camera is determined, the camera user may select the lock feature using a user input. The user may further select a game object 304, such as game object 304A, on which to lock the view of the camera by clicking on the game object 304, for example.

Figure 4B:
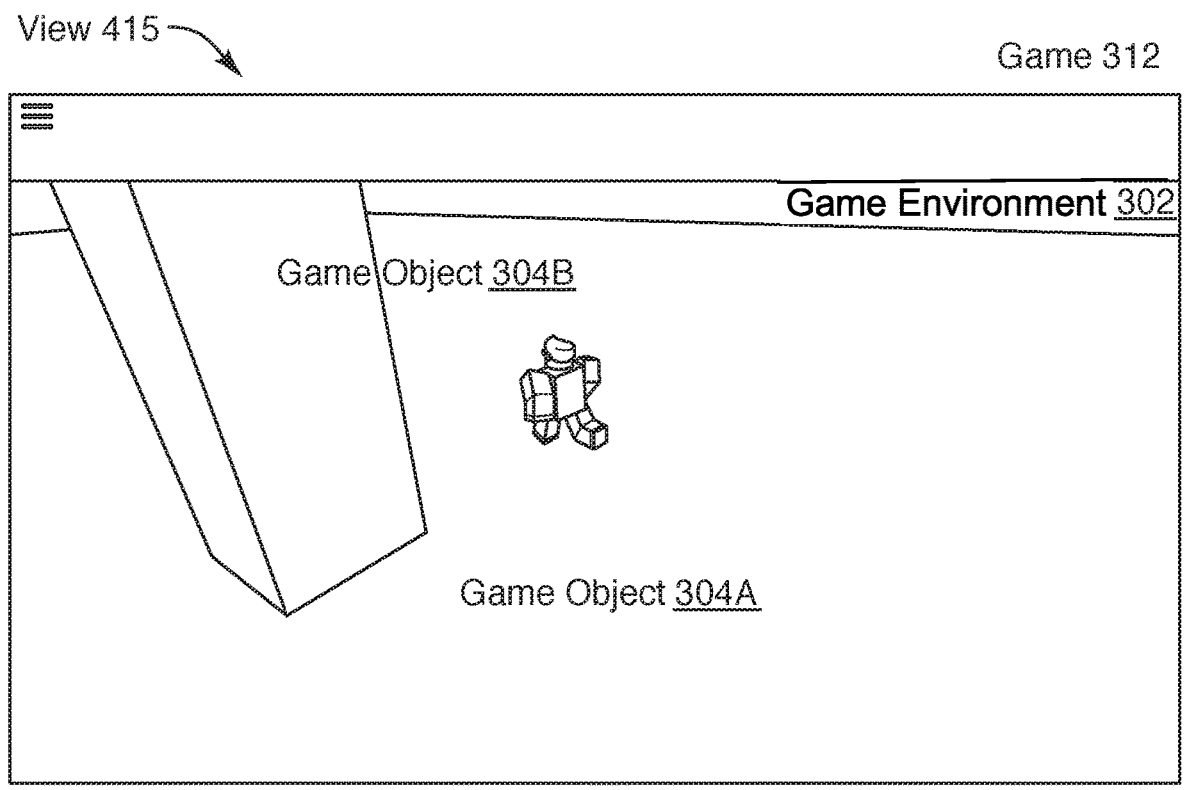

In FIG. 4B, view 415 shows the camera user moving the character in the game environment 302. The camera maintains its position in the game environment 302. The camera orientation is adjusted at the fixed position to allow the camera to follow (e.g., without additional user input to control the camera) the selected game object 304A within the game environment 302. As the camera adjusts its orientation, the presentation of the views from the perspective of the camera at the position are displayed on the client device 110.

Figure 4C:
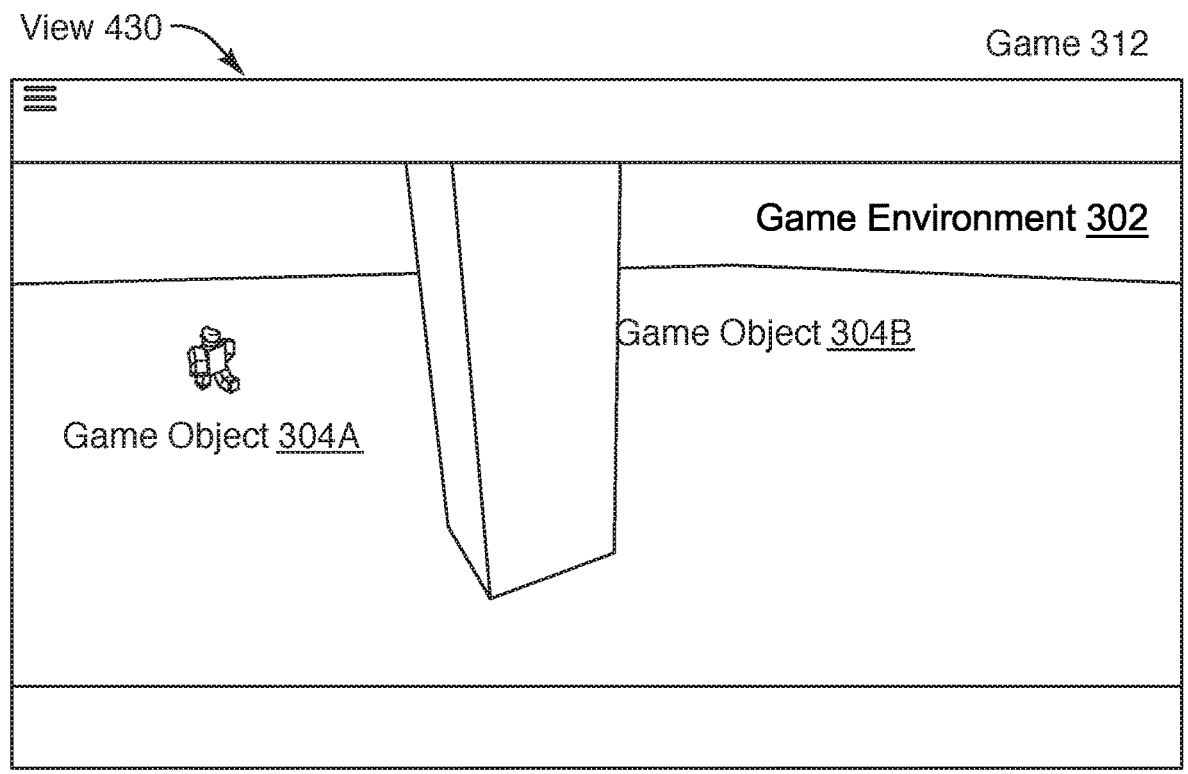
Figure 4D:
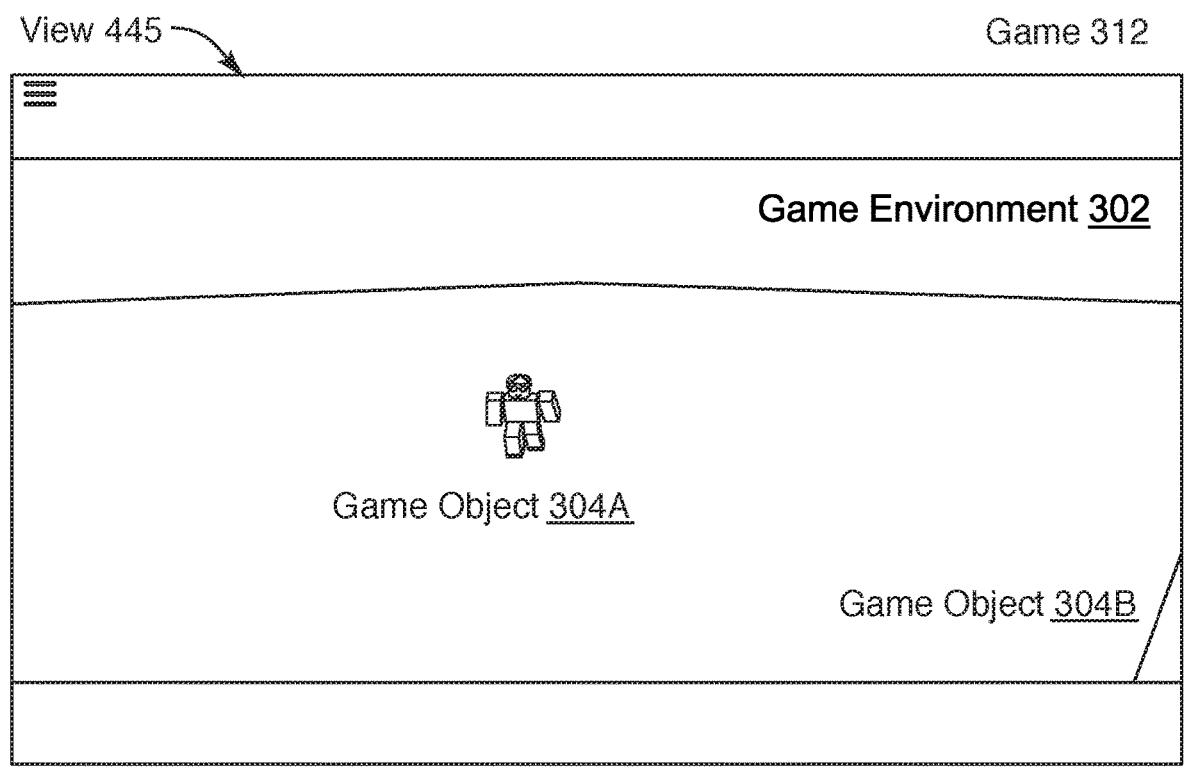
Figure 4E:
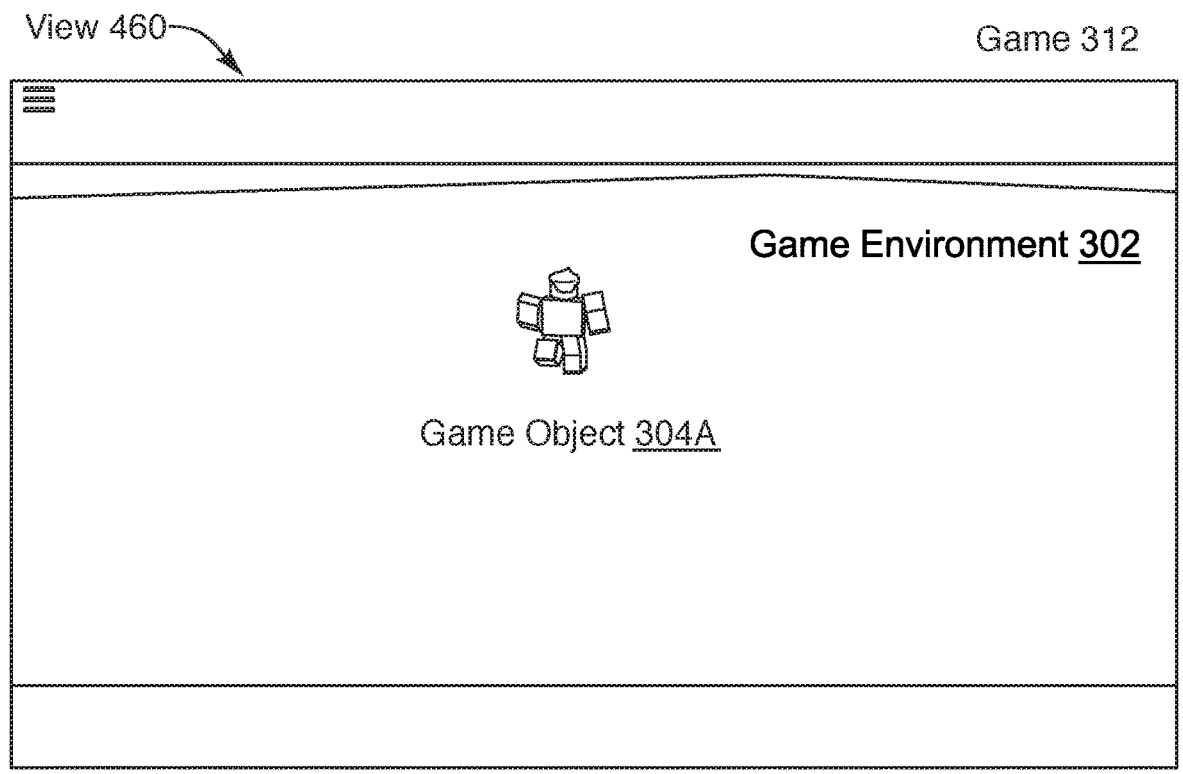

In FIG. 4C, view 430 shows the camera continuing to lock on to the character (i.e., game object 304A) as the character begins running away from the camera. In some implementations, the speed at which the camera changes orientation may be fixed. In other implementations, the speed at which the camera changes orientation may be variable. In FIG. 4D, view 445 shows the camera continuing to lock on to the character as the character runs towards the camera. In FIG. 4E, view 460 shows the camera continuing to lock on to the character as the character runs away from the camera.

Figure 4F:
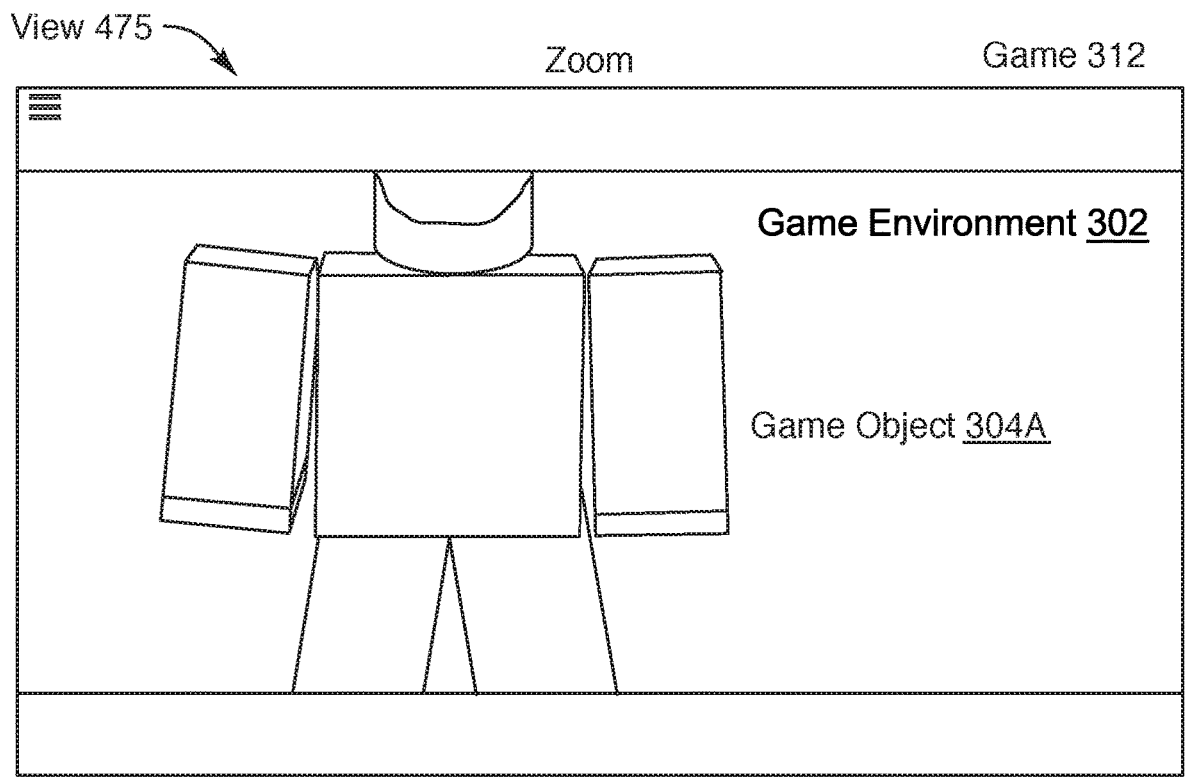

In FIG. 4F, view 475 shows the camera continuing to lock on to the character while the user selects a zoom feature of the camera. It may be noted that although the zoom feature is illustrated as implemented concurrently with the lock feature, the zoom feature may be implemented independently or concurrently with any other cinematic feature described herein. It may be further noted that with the lock feature and the zoom feature concurrently engaged, the position of the camera is still fixed.

In some implementations, the zoom feature allows the user to control the zoom of the camera. A user may zoom in to a view or zoom out of a view. Zooming in may magnify the game objects in a view (and remove some game objects that no longer fit in the view), and zooming out may compress the game objects in a view (and include some game objects that were previously outside the view). In implementations, zooming may change the view of the camera to include more (e.g., zoom out) or less (zoom in) of the particular portion of the game environment.

In some implementations, the cinematic features of the camera may include a track feature (not shown). A track feature may be similar to a lock feature but for the camera is not at a fixed position, but follows the game object at a given distance. For example, camera user may position the camera at particular distance from a game object 304. It may be noted that the given distance may be a range of distances (e.g., like an extendable and contractible leash). The camera user may position the camera a given distance from the game object. The camera user may select the track feature of the camera. The camera user may select the game object 304 that the camera is to track by selecting the game object 304 with a mouse click, for example. As the game object 304 moves, either controlled by the camera user or another user, the camera may follow game object at the given distance. The camera may (without input from the camera user) adjust the camera's position and orientation in the game environment 302 to follow the game object moving in the game environment 302. The presentation of the views from the perspective of the camera using the track feature may be displayed on the client device 110.

In some implementations, the camera user may change the orientation of the camera or change the position of the camera while the camera is still at the given distance from the selected game object. For example, as the game object is moving the camera user may move the camera to the side of the game object, and subsequently move the camera to the front of the game object while the distance between the camera and game object is maintained (by the track feature).

Figure 5:
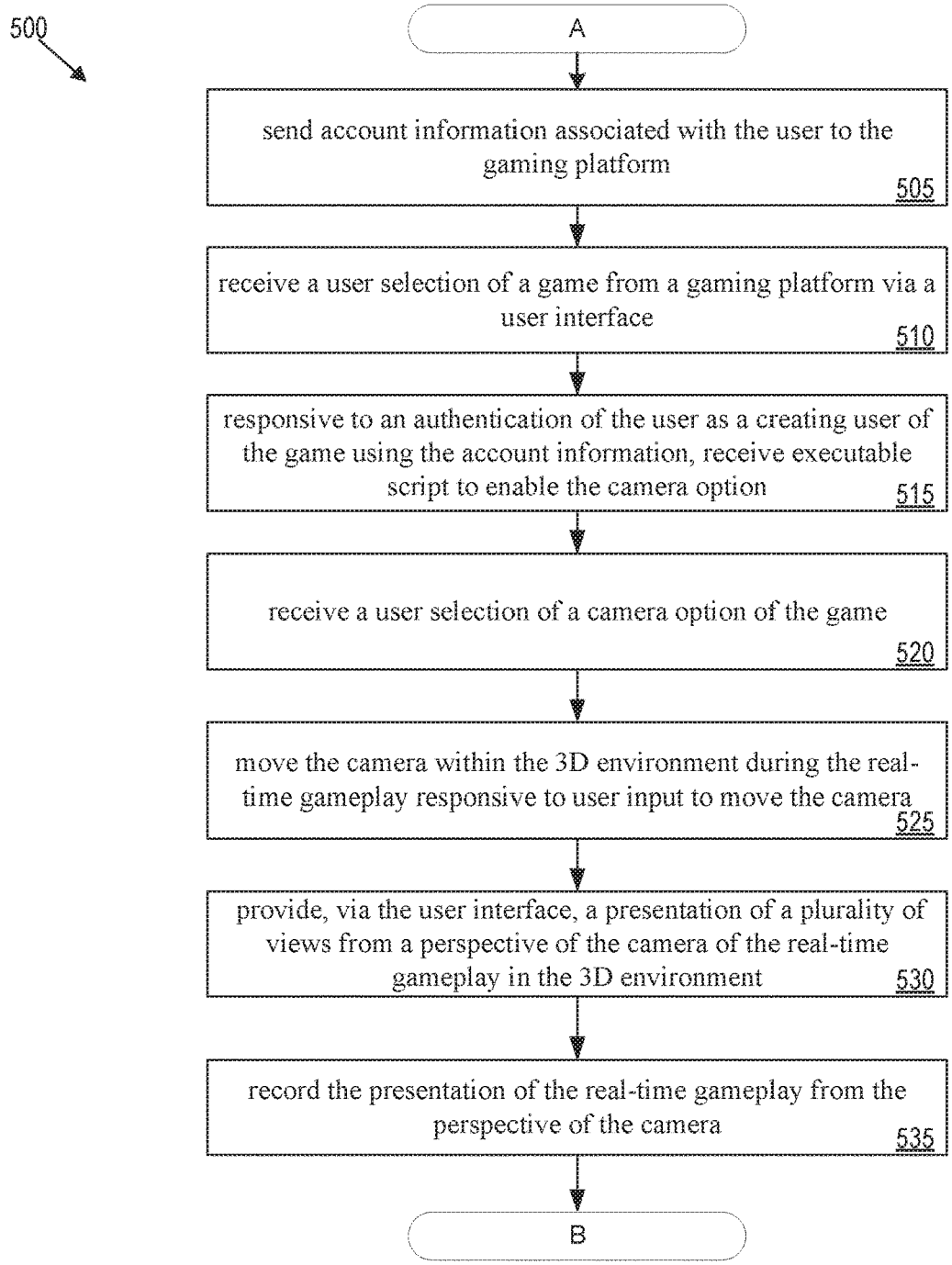
FIG. 5 is a flow diagram illustrating a method for using a camera that is controlled within an environment within a game by a user during real-time gameplay, in accordance with implementations of the disclosure.

FIG. 5 is a flow diagram illustrating method 500 for using a camera that is controlled within an environment within a game by a user during real-time gameplay, in accordance with implementations of the disclosure. Method 500 may be performed by processing logic that includes hardware (e.g., circuitry, dedicated logic, programmable logic, microcode), software (e.g., instructions run on a processing device to perform hardware simulation), or a combination thereof. In some implementations, game camera module 140 executing at a client device 110 may perform some or all the operations. In other implementations, game camera module 140 executing at collaboration platform 120, client device 110A, client device 110B, server 130 or combination thereof may perform some or all the operations. Elements of FIG. 1 through 4F may be used to help illustrated method 500. It may be noted that the in some implementations, method 500 may include the same, different, fewer, or greater operations performed in any order.

Method 500 begins at block 505 where processing logic performing method 500 sends account information (e.g., username and password) associated with the user to the gaming platform. For example, a user may login to the gaming platform using the user's username and password. The client device 110 may send the account information to the gaming platform for verification.

At block 510, processing logic receives a user selection of a game from multiple games from gaming platform via a user interface. For example, the games of the gaming platform may be displayed in the user interface as a group of icons. The user may select an icon from the group. The client device 110 may send an indication of the selection of the game to the gaming platform. The gaming platform may send information to the client device that enables the client device to operate the selected game on the client device 110.

At block 515, responsive to an authentication of the user as a creating user of the game using the account information, processing logic receives script, such as executable script or code (e.g., byte code), to enable the camera option in the user interface. In some implementations, the user is to be authenticated by the collaboration platform 120 (or third party) as a qualified user (e.g., qualified to use the camera). In some implementations, the qualified user may be a user that created or owns the particular selected game. Such authentication may help prevent cheating on the system. For example, playing users (other than the creating user) that want to spy on other players may not be allowed to use the camera option. Responsive to the user being authenticated as a creating user, collaboration platform 120 may send executable script to the client device to enable the camera option. In some implementations, the creating user may not explicitly request the camera option. Rather the camera option may be sent to the client device responsive to authentication and without an explicit request from the creating user. In other implementations, the creating user may explicitly request the camera option be enabled on the client device 110.

At block 520, processing logic receives a user selection of the camera option for the game. For example, the user may select an icon that enables the execution of the camera option at the client device.

At block 525, processing logic may move the camera within the 3D environment of the game during real-time gameplay responsive to user input to move the camera. For example, the user may begin controlling the camera by moving the camera within the 3D environment without restriction. It may be noted that the camera and a character may concurrently controlled by the camera user.

At block 530, processing logic provides, via the user interface, a presentation of the views from the perspective of the camera of the real-time gameplay in the 3D environment. For example, the views of the camera may be presented in the display of the client device. It may be noted that from the point in time the camera option is enable to the point in time the camera option is disabled, the views of the camera may be presented in the display of the client device.

At block 535, processing logic records the presentation of the real-time gameplay from the perspective of the camera. It may be noted that the camera user may record any amount of the real-time gameplay from the perspective of the camera that is presented on the client device. The camera user may record the entire presentation, start and stop the recordation at multiple points, or not record the presentation, for example. In some implementations, the presentation of the views is recorded locally by the client device. In other implementations, the presentation of the views is recorded by collaboration platform 120.

Figure 6:
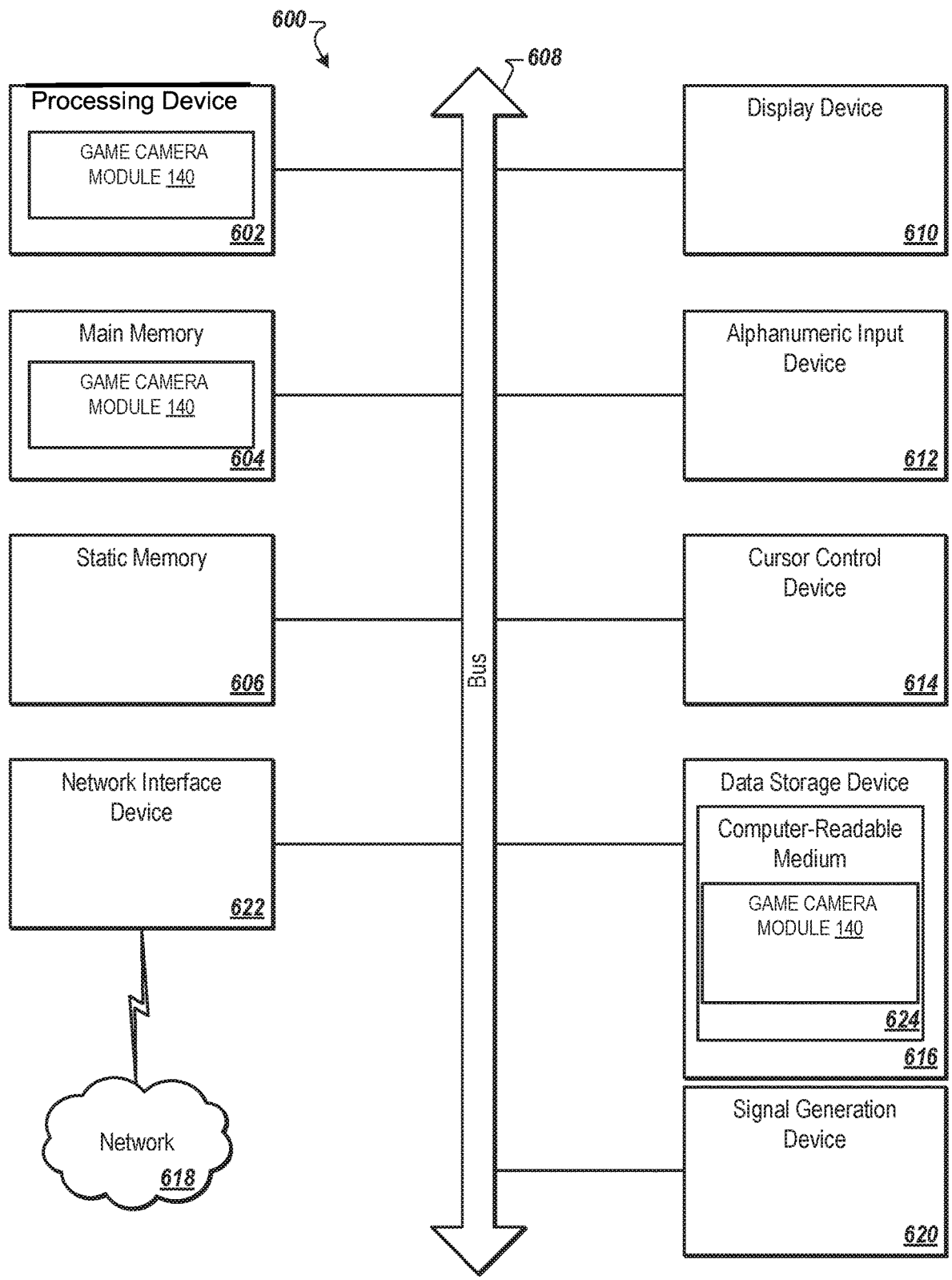
FIG. 6 is a block diagram illustrating an exemplary computer system, in accordance with implementations of the disclosure.

FIG. 6 is a block diagram illustrating an exemplary computer system 600, in accordance with implementations. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of game camera module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and the game camera module 140 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 and game camera module 140 embodying any one or more of the methodologies or functions described herein. The sets of instructions of the system architecture 100 and game camera module 140 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operation s leading to a desired result. The sequence of operations is those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "performing," "generating," "receiving," "determining," "verifying," "identifying," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or embodiment unless described as such. One or more implementations or embodiments may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

We claim:

1. A method, comprising:
   receiving a user selection of a multi-player three-dimensional (3D) game from a gaming platform via a user interface;
   receiving a user selection, from a camera user, of a camera option of the game, wherein the camera option enables a camera to be controlled, by the camera user, within a 3D environment of the game during real-time gameplay, wherein the camera is independent of and unattached to characters of game players that play the game, and wherein the camera is visible to the game players during the real-time gameplay without affecting game objects in the 3D environment;
   moving, by a processing device, the camera within the 3D environment during the real-time gameplay responsive to user input from the camera user to move the camera, wherein moving the camera within the 3D environment during the real-time gameplay responsive to the user input from the camera user to move the camera comprises:
      stabilizing movement of the camera to smoothen a plurality of views of the real-time gameplay in the 3D environment as captured by the camera, wherein stabilizing the movement of the camera includes:
         filtering data points of the user input that are associated with rapid changes in camera position caused by hand movement of the camera user while providing the user input; and
         using the filtered user input to direct the movement of the camera; and
   responsive to moving the camera within the 3D environment, providing, via the user interface, a presentation of the plurality of views from a perspective of the camera of the real-time gameplay in the 3D environment.

2. The method of claim 1, further comprising:
   recording the presentation of the plurality of views of the real-time gameplay from the perspective of the camera.

3. The method of claim 1, wherein moving the camera within the 3D environment during the real-time gameplay responsive to the user input by the camera user to move the camera further comprises:
   changing the camera position within the 3D environment during the real-time gameplay.

4. The method of claim 1, wherein moving the camera within the 3D environment during the real-time gameplay responsive to the user input from the camera user to move the camera further comprises:
   changing an orientation of the camera within the 3D environment during the real-time gameplay.

5. The method of claim 1, wherein moving the camera within the 3D environment during the real-time gameplay further comprises:
   responsive to receiving additional user input from the camera user to select a pan feature of the camera, identifying a game object of the 3D environment selected by the user;
   determining a center of the game object; and
   rotating the camera around the center of the game object, wherein the presentation of the plurality of views from the perspective of the camera represents a rotation around the center of the game object.

6. The method of claim 1, wherein moving the camera within the 3D environment during the real-time gameplay further comprises:
   receiving additional user input from the camera user to select a lock feature of the camera;
   identifying a game object of the 3D environment to be presented in a view of the plurality of views from the perspective of the camera; and
   adjusting an orientation of the camera at the camera position to allow the camera to follow the game object within the 3D environment, wherein the presentation of the plurality of views from the perspective of the camera shows the game object in the 3D environment from the perspective of the camera.

7. The method of claim 1, wherein moving the camera within the 3D environment during the real-time gameplay further comprises:
   receiving additional user input from the camera user to select a track feature of the camera;
   identifying a game object in the 3D environment to track; and
   adjusting the camera position and an orientation of the camera in the 3D environment to follow the game object which is moving within the 3D environment, wherein the presentation of the plurality of views from the perspective of the camera shows the game object in the 3D environment from the perspective of the camera at the camera position.

8. The method of claim 1, further comprising:
   responsive to additional user input from the camera user to control a zoom of the camera, changing a view of the camera to include more or less of the 3D environment.

9. The method of claim 1, further comprising:
   sending account information associated with the camera user to the gaming platform; and
   responsive to an authentication of the camera user as a creator user of the game that uses the account information, receiving executable script to enable the camera option.

10. The method of claim 1, further comprising:
    receiving additional user input from the camera user to control a character associated with the camera user; and
    responsive to the additional user input by the camera user to control the character, moving the character within the 3D environment, wherein the character and the camera are concurrently controlled by the camera user.

11. A client device, comprising:
a memory; and
a processing device coupled to the memory, wherein the processing device is configured to:
  receive a user selection of a multi-player three-dimensional (3D) game from a gaming platform via a user interface;
  receive a user selection, from a camera user, of a camera option of the game, wherein the camera option enables a camera to be controlled, by the camera user, within a 3D environment of the game during real-time gameplay, wherein the camera is independent of and unattached to characters of game players that play the game, and wherein the camera is visible to the game players during the real-time gameplay without affecting game objects in the 3D environment;
  move the camera within the 3D environment during the real-time gameplay responsive to user input from the camera user to move the camera, wherein moving the camera within the 3D environment during the real-time gameplay responsive to the user input from the camera user to move the camera comprises:
    stabilizing movement of the camera to smoothen a plurality of views of the real-time gameplay in the 3D environment as captured by the camera, wherein stabilizing the movement of the camera includes:
      filtering data points of the user input that are associated with rapid changes in camera position caused by hand movement of the camera user while providing the user input; and
      using the filtered user input to direct the movement of the camera; and
  responsive to moving the camera within the 3D environment, provide, via the user interface, a presentation of the plurality of views from a perspective of the camera of the real-time gameplay in the 3D environment.

12. The client device of claim 11, wherein the processing device is further configured to:
record the presentation of the plurality of views of the real-time gameplay from the perspective of the camera.

13. The client device of claim 11, wherein the processing device is further configured to:
send account information associated with the camera user to the gaming platform; and
responsive to an authentication of the camera user as a creator user of the game that uses the account information, receive executable script to enable the camera option.

14. The client device of claim 11, wherein to move the camera within the 3D environment during the real-time gameplay, the processing device is further configured to:
responsive to receiving additional user input from the camera user to select a pan feature of the camera, identify a game object of the 3D environment selected by the user;
determine a center of the game object; and
rotate the camera around the center of the game object, wherein the presentation of the plurality of views from the perspective of the camera represents a rotation around the center of the game object.

15. A non-transitory computer readable medium comprising instructions that, responsive to execution by a processing device, cause the processing device to perform or cause performance of operations comprising:
receiving a user selection of a multi-player three-dimensional (3D) game from a gaming platform via a user interface;
receiving a user selection, from a camera user, of a camera option of the game, wherein the camera option enables a camera to be controlled, by the camera user, within a 3D environment of the game during real-time gameplay, wherein the camera is independent of and unattached to characters of game players that play the game, and wherein the camera is visible to the game players during the real-time gameplay without affecting game objects in the 3D environment;
moving the camera within the 3D environment during the real-time gameplay responsive to user input from the camera user to move the camera; and
responsive to moving the camera within the 3D environment, providing, via the user interface, a presentation of the plurality of views from a perspective of the camera of the real-time gameplay in the 3D environment.

16. The non-transitory computer readable medium of claim 15, wherein the operations further comprise:
recording the presentation of the plurality of views of the real-time gameplay from the perspective of the camera.

17. The non-transitory computer readable medium of claim 15, wherein moving the camera within the 3D environment during the real-time gameplay further comprises:
responsive to receiving additional user input from the camera user to select a pan feature of the camera, identifying a game object of the 3D environment selected by the user;
determining a center of the game object; and
rotating the camera around the center of the game object, wherein the presentation of the plurality of views from the perspective of the camera represents a rotation around the center of the game object.

18. The non-transitory computer readable medium of claim 15, wherein moving the camera within the 3D environment during the real-time gameplay responsive to the user input from the camera user to move the camera comprises:
stabilizing movement of the camera to smoothen a plurality of views of the real-time gameplay in the 3D environment as captured by the camera, wherein stabilizing the movement of the camera includes:
  filtering data points of the user input that are associated with rapid changes in camera position caused by hand movement of the camera user while providing the user input; and
  using the filtered user input to direct the movement of the camera.

* * * * *